Figure 1:
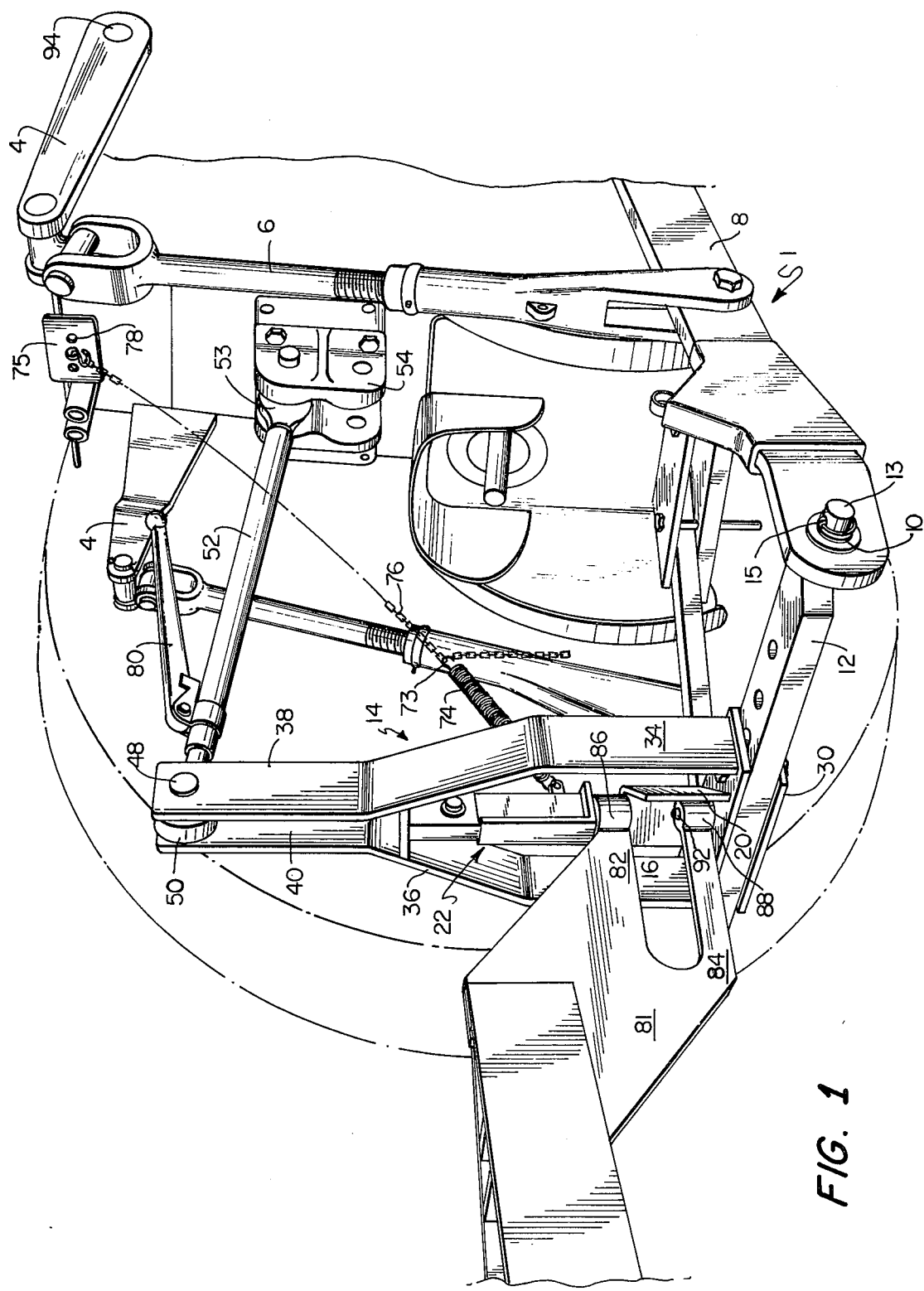

United States Patent [19]

Griffin, Jr.

[11] 4,071,262
[45] Jan. 31, 1978

[54] TRAILER HITCH APPARATUS WITH LOCKING MEANS

[76] Inventor: Horace D. Griffin, Jr., 7704 Whaleyville Blvd., Suffolk, Va. 23438

[21] Appl. No.: 750,120

[22] Filed: Dec. 13, 1976

[51] Int. Cl.$^2$ .............................................. B60D 1/04
[52] U.S. Cl. ................................................ 280/479 A
[58] Field of Search ................ 280/477, 479 R, 479 A

[56] References Cited

U.S. PATENT DOCUMENTS

| 2,320,168 | 5/1943 | Benjamin | 280/479 A |
|---|---|---|---|
| 2,544,181 | 3/1951 | Richey | 280/479 A |
| 2,904,349 | 9/1959 | Frieberg | 280/479 A |
| 3,827,724 | 8/1974 | Ackley | 280/479 A X |

*Primary Examiner*—Joseph F. Peters, Jr.
*Assistant Examiner*—R. Schrecengost
*Attorney, Agent, or Firm*—Roylance, Abrams, Berdo & Kaul

[57] ABSTRACT

A trailer hitch apparatus includes a detachable hitch frame unit mounted to a drawbar on the rear of a tractor. The hitch frame unit includes at its bottom center, a connecting pin adapted to fit into an aperture at the forward end of the trailer tongue, a guide element mounted in front of said hitch rod, and a spring-biased locking device including a locking arm pivotally mounted above the connecting pin. The drawbar is coupled to power means on the tractor for raising and lowering the connecting pin into and out of the trailer tongue aperture to couple and uncouple the trailer and tractor. In its operative position the locking arm engages the top of the trailer tongue while the connecting pin extends through the trailer tongue aperture, thereby preventing accidental disengagement of the trailer tongue. The locking pin arm automatically locks in its operative position when the hitch assembly is raised and automatically unlocks to a release position when the hitch assembly is lowered.

7 Claims, 6 Drawing Figures

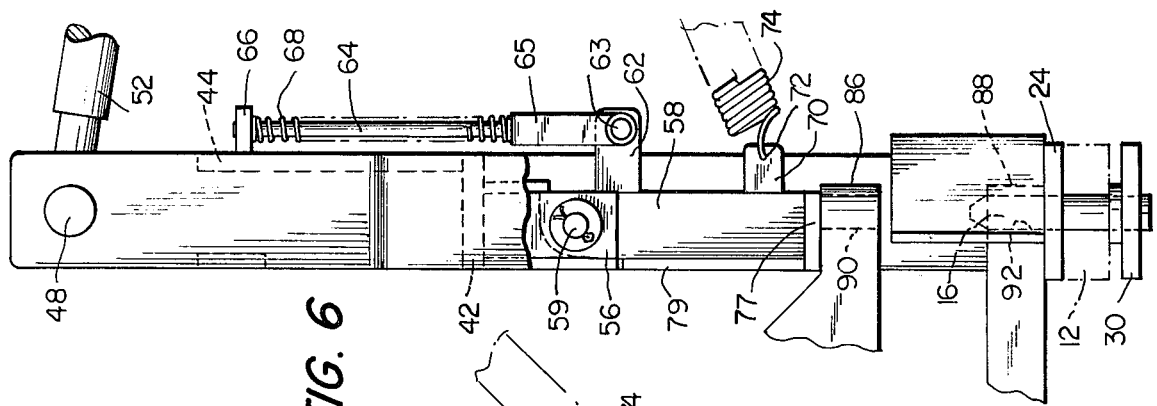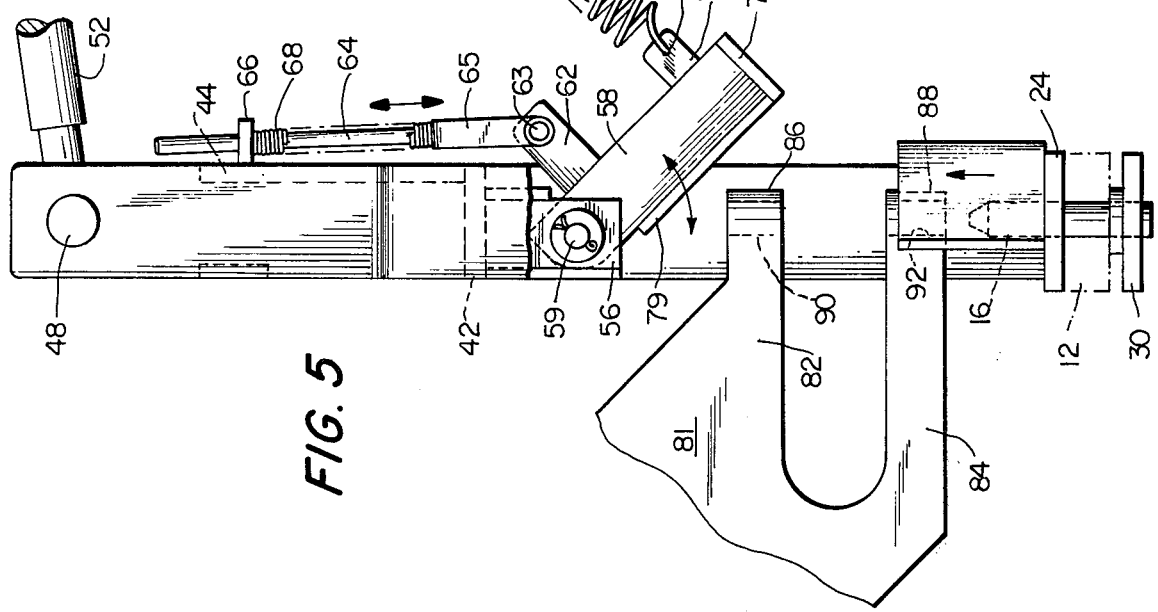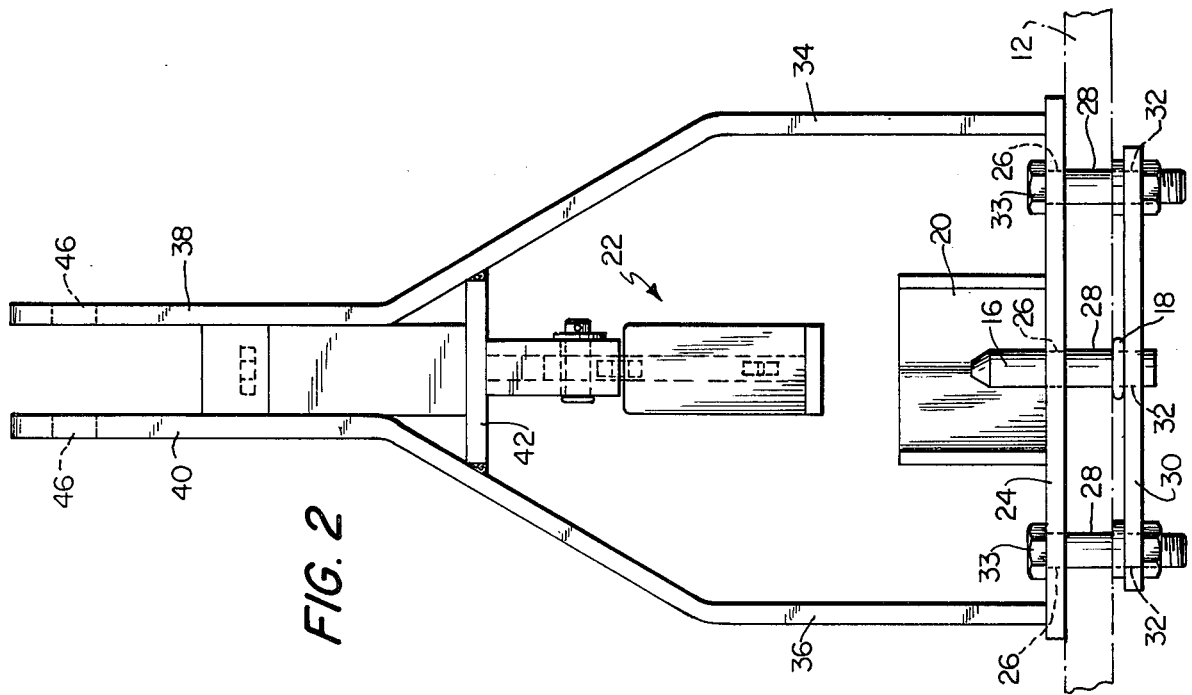

TRAILER HITCH APPARATUS WITH LOCKING MEANS

This invention relates to a trailer hitch assembly and more particularly it relates to an assembly of the type where a hitch rod on the tractor hitch assembly is lined up beneath an aperture at the end of the trailer tongue and the coupling of these two parts is then achieved by raising the hitch rod into the trailer tongue aperture. Hitch assemblies, in general, have been known in the art, as exemplified by the assembly shown in U.S. Pat. No. 2,544,181. One of the shortcomings of such known forms of hitch assemblies is the possibility that the trailer tongue could bounce off of the hitch rod and become disconnected from the tractor. This could result in personal injury due to a runaway trailer or in damage to machinery or goods being carried on the trailer as well as considerable inconvenience to the tractor operator. The present invention is addressed to a means for locking a trailer tongue in its coupled position to avoid such accidental disconnections.

It is a primary object of the present invention to provide a new and improved power operated trailer hitch which will secure the trailer tongue on the hitch while the trailer is coupled to the tractor.

A further object of the present invention is to provide a secure trailer hitch which may be readily hitched or unhitched by the tractor operator while remaining on his operator's seat on the tractor.

Another object of the present invention is to provide a secure trailer hitch with a hitch frame unit that is easily removable from the tractor drawbar in order to provide for hookup of other apparatus to the drawbar or access to the implement power take-off located at the bottom rear of the tractor.

Another object of the present invention is to provide a positively locking trailer hitch which automatically unlocks when the hitch assembly is lowered and automatically locks when the hitch assembly is raised.

Yet another object of the present invention is to provide an effective and reliable trailer hitch according to the above objectives having a relatively simple construction and operation.

Other objects, advantages, and salient features of the present invention will become apparent from the following detailed description, which, taken in conjunction with the annexed drawings, discloses a preferred embodiment of the present invention.

The foregoing objectives are attained by providing a trailer hitch which comprises a hitch assembly including a drawbar coupled to said tractor and having a hitch frame unit detachably mounted to said drawbar. The hitch frame unit has at its bottom center a connecting pin adapted to fit into an aperture at the forward end of the trailer tongue, a guide element mounted in front of the connecting pin, and a spring-biased locking device pivotally mounted directly above the connecting pin. The hitch assembly is coupled to power means on the tractor for raising the connecting pin into the trailer tongue aperture to effect a coupling of the tractor and trailer and for lowering the connecting pin out of the trailer tongue aperture in order to uncouple the trailer from the tractor. In its operative position, the locking arm of the locking device will engage against the top of the trailer tongue thereby retaining the trailer tongue between the drawbar and said locking arm while the trailer is coupled to the tractor. An elongated control cable is operatively connected to the locking arm and is adjusted to a taut condition when the hitch assembly is raised and the locking arm is operative. As the hitch assembly lowers, the cable pulls upon and pivots the locking arm to cause it to release when the hitch assembly reaches its lowered position.

Figure 4:
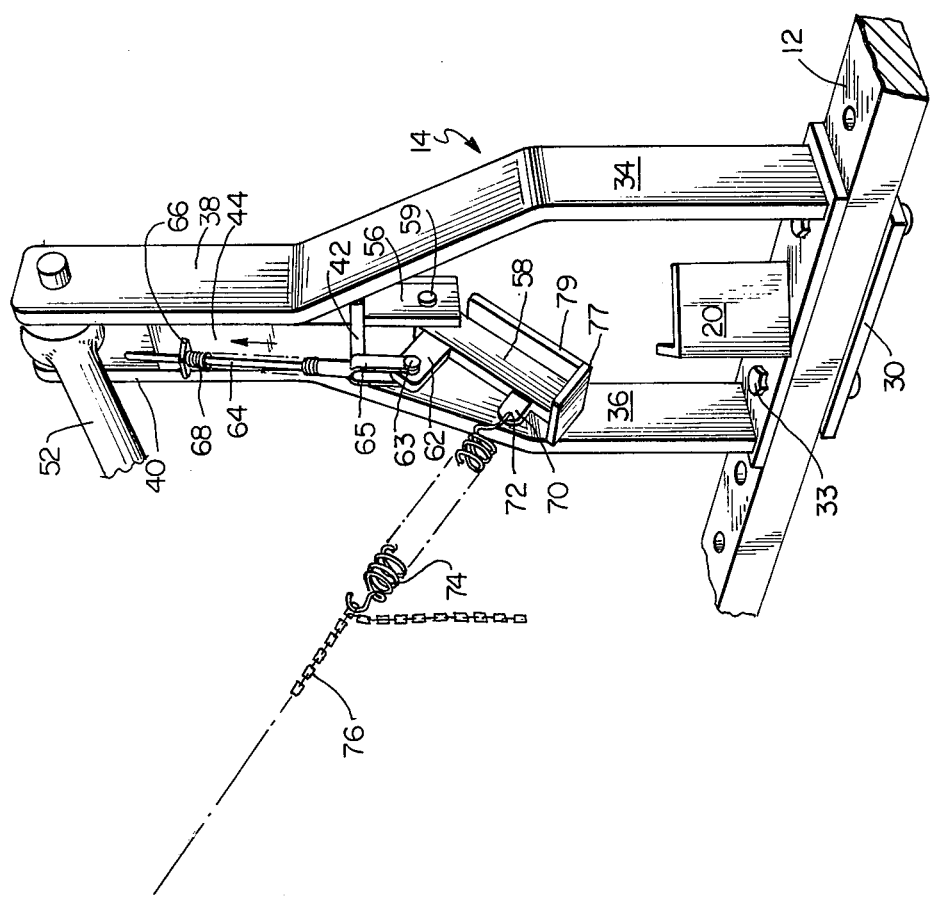
Figure 3:
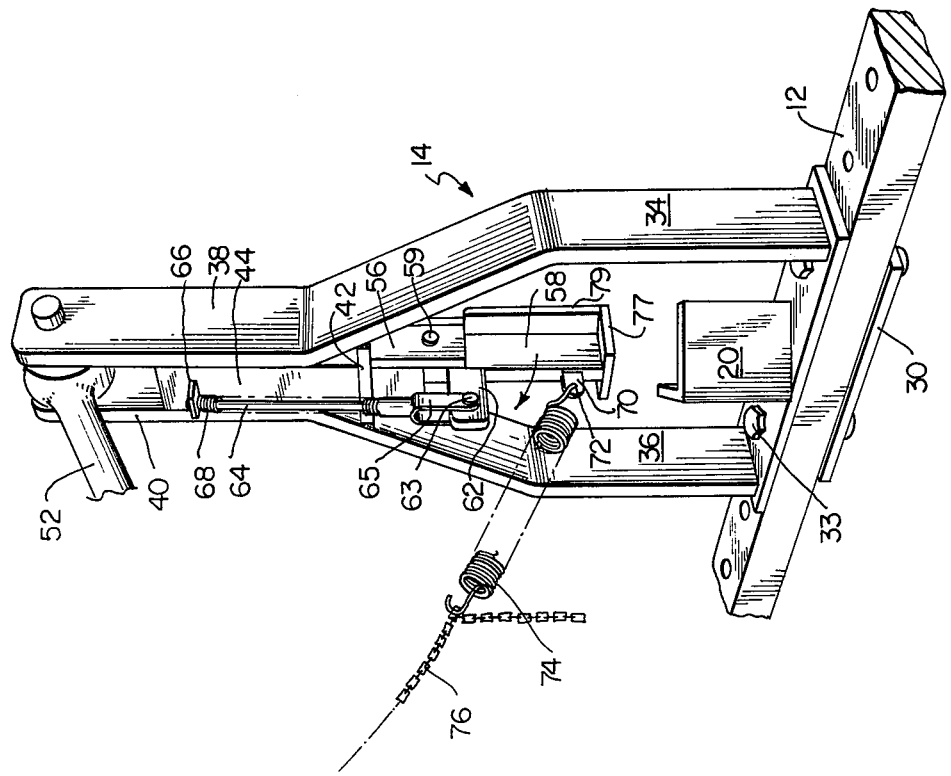

Referring now to the drawings, which form a part of this original disclosure:

FIG. 1 is a rear perspective view of the hitch assembly of the present invention, as mounted on a tractor, FIG. 2 is a rear elevational view of the hitch frame unit and its components mounted on the drawbar, FIG. 3 is a front perspective view of the locking device in its operative position on the hitch frame unit, FIG. 4 is a front perspective view of the locking device in its release position, FIG. 5 is a side elevational view of the trailer tongue engaged fully within the guide element, and FIG. 6 is a side elevational view of the trailer tongue locked in place on the connecting pin between the drawbar and the vertical arm of the locking device.

Referring now to the drawings in further detail, there is shown in FIG. 1 the hitch frame unit of the present invention which is generally designated 14 and which is shown mounted on the rear end of a tractor. The hitch frame unit 14 as mounted on the drawbar and attached by arms and links to a tractor and to the power means thereof can be referred to as the hitch assembly and is generally designated 1.

The tractor includes power arms 4 on each side thereof extending rearwardly and providing vertical power means. Each power arm 4 is connected to a lower support arm 8 by an adjustable link 6 which is pivotally connected at its upper end to the power arm 4 and at its lower end to the support arm 8. At the outer end of each support arm 8 is a hole 10 for receiving the rounded end 13 of an otherwise flat drawbar 12. Thus, the drawbar 12 extends across the open span between the outer ends of the support arms 8 and is retained there by means of cotter pins 15 extending through the outer ends of the rounded drawbar ends 13.

Detachably mounted on the drawbar 12 is the hitch frame unit 14 including at its bottom center a connecting pin 16 with a beveled upper end and an annular protuberance 18 near its lower end, a guide element 20 spaced forwardly of the connecting pin 16, and a locking device generally designated 22 pivotally mounted directly above the connecting pin 16. As used herein, the term "front" or "forward" shall refer to the tractor end, and the term "rear" or "rearward" shall refer to the trailer end.

Referring now to FIG. 2, the hitch frame unit 14 can be seen as having a bottom horizontal bar portion 24 with three successive holes 26 aligned with three holes 28 at the center of the drawbar 12. The connecting pin 16 is set into the middle of three corresponding holes 32 in a lower plate 30 to be mounted under the drawbar 12 concurrently with the mounting of the hitch frame unit 14. The holes 26 and 32 can be slotted slightly to compensate for varying distances between the drawbr holes 28. Thus, when the lower plate 30 and the horizontal bar portion 24 of the frame unit 14 are bolted to the drawbar 12 by means of bolts 33 through the outer two holes of holes 26, 28 and 32, the connecting pin 16 extends up through the bottom center of the hitch frame unit 14. The guide element 20 is V-shaped in configuration and is welded onto the bar portion 24 in front of the connecting pin 16, with the apex of the V pointing forward. As can be seen from FIG. 2, the height of the guide element 20 exceeds the height of the connecting pin 16.

The hitch frame unit 14 further includes upright arms 34 and 36 attached at the opposite ends of the horizontal bar portion 24 and which bend and converge to straight upright portions 38 and 40, respectively. A transverse brace 42 is connected between the arms 34 and 36. The upright portions 38 and 40 have aligned holes 46 formed therein for receiving a pivot bolt 48 which extends through the outer end 50 of a support arm 52. At its other end 53, the support arm 52 is pivotally attached to a bracket 54 mounted upon the rear of the tractor.

The details of the locking device 22 can be best seen from FIGS. 3 and 4. As shown therein, a bracket 56 extends downward from the transverse brace 42 for pivotally mounting a locking arm 58. A pivot pin 59 extends through the bracket 56 and the upper end of the locking arm 58 so that the locking arm can pivotally move between its FIG. 3 position and its FIG. 4 position. The locking arm 58 carries a forwardly extending lug 62 which is connected to a control rod 64 by means of a second pivot pin 63 which extends through a yoke 65 at the lower end of the rod 64. The upper end of the control rod 64 passes through a guide ring 66 which is welded to a front plate 44 attached between the upright portions 38 and 40. A compression spring 68 is coiled around the control rod 64 and restrained by the guide ring 66 near the top of the rod 64. The biasing force of the spring 68 continuously forces the locking arm 58 into its operative position as shown in FIG. 3. Another lug 70 with a hole 72 therein extends from the forward side of the locking arm 58. A tension spring 74 is connected at one end to the hole 72 in the lug 70 and at the other end there is provided a hook 73 which connects an elongated control cable in the form of a length of chain 76. The chain 76 extends up to plate 75 adjacent to the tractor operator's seat (not shown) an a S-hook 78 on the end of the chain 76 attached to an aperture in the plate 75. The chain 76 and spring 74 form a manually operable elongated control cable for pivoting the locking arm 58. A pad 77 is attached to the lower end of the locking arm 58 and a reinforcing plate 79 is attached to the rear surface of the locking arm.

When the locking arm 58 is in its operative position, as shown in FIG. 3, the top of the reinforcing plate 79 engages against the bottom rear of the bracket 56 thereby preventing the locking arm 58 from pivoting rearward beyond the vertical axis. This restraint in combination with the biasing force of the compression spring 68 secures the locking arm 58 in its operative position while the trailer is coupled to the tractor.

The operative position of the locking device 22, as shown in FIG. 3, is characterized by the locking arm 58 thereof being in a vertical position with the pad 77 engaged against the top of the trailer tongue top forward portion 86 while being subject to the biasing force of the compression spring 68.

The release position of the locking device 22, as shown in FIG. 4, is characterized by the locking arm 58 having been automatically pivoted forward sufficiently, by pulling force exerted by the chain 76, to disengage the top of the trailer tongue top forward portion 86 and to allow the connecting pin 16 to be lowered clear of the bottom of the bottom forward portion 88 of the trailer tongue.

The support arm 53 is extensible to facilitate true vertical mounting of the hitch frame unit 14. To accomplish this extensibility, the arm 53 is formed of telescoped tubular members and is provided with a locking handle 80 which, when depressed, locks the telescoped members in position.

As shown in FIG. 1, the trailer has a forwardly extending tongue 81 which is bifurcated to form an upper tongue portion 82 and a lower tongue portion 84. Each of these portions has an enlarged boss, 86 and 88 respectively, at its forward end and aligned apertures 90 and 92 extend therethrough.

A power means is provided for the purpose of selectively raising and lowering the hitch assembly 1. This power means advantageously takes the form of a driven shaft 94 on the tractor. The forward ends of the power arms 4 are attached to this shaft 94 so that as the shaft is rotated under the control of the tractor operator, the hitch assembly 1 is selectively raised or lowered.

Referring now to FIG. 5 and FIG. 6 in order to describe the operation of the apparatus of the invention, the trailer tongue 81 is initially positioned with its bottom edge at least 3 inches, and preferably 9 to 10 inches, above the ground and the tractor is backed into close proximity thereto. While the hitch assembly 1 is in its elevated position, the chain 76 is made taut by adjustment at the spring hook end 73. Thereafter, the power means 94 is activated to lower the hitch assembly 1 until the connecting pin 16 is positioned slightly beneath the level of the lower trailer tongue aperture 92. The locking arm 58 is thereby automatically then pulled forward and upward to its release position due to the pulling force exerted by the chain 76, until the locking arm reaches the position shown in FIG. 4. The tractor is then slowly backed toward the trailer tongue until the forward end 88 of the lower tongue portion 84 is positioned fully into the apex of the guide element 20 as shown in FIG. 5. The lower tongue aperture 92 is at this time in alignment with the connecting pin 16 immediately below it on the hitch frame unit 14. The power means 94 is then activated to raise the hitch assembly until the connecting pin 16 projects through the lower tongue aperture 92. This raising of the hitch assembly gradually but automatically releases the tension on the chain 76 allowing the locking device 22 to move to its operative position in which pad 77 on the bottom of the locking arm 58 is engaged against the top of the trailer tongue forward portion 86 to retain the trailer tongue in locked position as shown in FIG. 6. In the raised position of the hitch assembly, the drawbar 12 is preferably 20 to 21 inches above the ground in order to assure that the locking device 22 is fully locked.

The combination of the restraint against rearward movement beyond the vertical axis provided by the top of the reinforcing plate 79 and the biasing action of compressing spring 68 on the locking arm 58 keeps the locking arm 58 in its vertical, operative position while the connecting pin 16 is disposed within the trailer tongue aperture 92. The security of this locking system is further enhanced by the position of the guide element 20 which is in front of the connecting pin 16. This placement of the guide element 20 prevents the trailer tongue from bouncing forward to any substantial degree and thereby prevents such forward movement of the trialer tongue from overcoming the biasing action of the compression spring 68 and itself releasing the locking arm 58. Preferably, the top of the guide element 20 does not extend to the upper tongue portion 82 when in hitched condition.

In order to unhitch the trailer, any suitable support device is positioned beneath the lower tongue portion 84 to keep such portion off the ground sufficiently to lower the connecting pin 16 beneath bottom of the lower forward portion 88 of the trailer tongue 81. Thereafter, the locking device is pulled to and secured in the release position as described above. The power means is then activated to lower the hitch assembly 1 until the connecting pin 16 is positioned slightly beneath the lower trailer tongue aperture 92 and the tractor may be driven away from the trailer 50.

As shown, the height of the guide element 20 is such that the forward portion and 88 of the trailer tongue fit therein. While the length of the connecting pin 16 is illustrated is only long enough to fit through the lower aperture 92, it is entirely within the purview of this invention to provide a connecting pin of a length long enough to project into and partially through the upper tongue aperture 90. While most trailer tongues have approximately the same height, and hence the same spacing between the drawbar 12 and pad 77 can generally be constant, it is possible to compensate for trailer tongues of differing heights in numerous conventional ways, such as by simply elongating the upright arms 34 and 36.

For a manual operation, as opposed to an automatic operation, one can simply loosen the tension on the chain 76 when the hitch assembly 1 is lowered. Then, when the locking device 22 is to be released, the chain 76 can be manually pulled.

Various other changes and modifications apparent to those skilled in the art may be made without departing from the spirit and scope of the invention as defined in the appended claims.

What is claimed is:

1. A trailer hitch apparatus for connecting a trailer tongue to a tractor, comprising:
   a hitch assembly coupled with said tractor;
   said hitch assembly including a connecting pin adapted to fit into an aperture at the forward end of the trailer tongue;
   power means connected with said hitch assembly;
   said power means being operative to selectively lower said hitch assembly to position said connecting pin beneath the level of said trailer tongue;
   said power means being operative to selectively raise said hitch assembly to position said connecting pin within said trailer tongue aperture;
   said hitch assembly including a movable locking device having a locking arm;
   said locking device being moved to a release position when said hitch assembly is lowered;
   said locking device being moved to an operative position after said hitch assembly is raised; and
   said locking arm being engaged against the top of said trailer tongue when said locking device is in its operative position to thus retain said trailer tongue coupled with said hitch assembly while said connecting pin is disposed within said trailer tongue aperture;
   said locking device including a biasing spring normally urging said locking arm to a position where it is axially aligned with and disposed above said connecting pin;
   said locking device further including means pivotally mounting said locking arm, a lug projecting from said locking arm and coupled to a control rod, and said biasing spring being operative to normally urge said control rod and said lug to a position which resists pivoting of said locking arm.

2. A trailer hitch apparatus according to claim 1 wherein said hitch assembly includes:
   a horizontally disposed drawbar; and
   a hitch frame unit mounted on said drawbar;
   said hitch frame unit including a guide element disposed adjacent to said connecting pin.

3. A trailer hitch apparatus according to claim 1 further including a biasing means normally urging said locking means to said operative position and an elongated control cable connected to said locking means to overcome the urging of said biasing means and move said locking means to said release position when said hitch assembly is lowered.

4. A trailer hitch apparatus for connecting a trailer tongue to a tractor, comprising:
   a hitch assembly adapted to be coupled with a tractor;
   said hitch assembly including a horizontally disposed drawbar;
   a hitch frame unit mounted on said drawbar;
   said hitch frame unit including a connecting pin adapted to fit into an aperture at the forward end of the trailer tongue, a guide element disposed adjacent to said connecting pin, and a locking device having a locking arm pivotally mounted above said connecting pin.
   said locking arm having a bottom portion for engaging the top forward portion of said trailer tongue to retain said trailer tongue coupled with said hitch assembly while said connecting pin is disposed within said trailer tongue aperture;
   a biasing spring connected to said locking arm which continually urges said locking arm to remain in its operative position engaged with the top of the coupled trailer tongue;
   an elongated control cable operatively connected to said locking arm to overcome the biasing force of said spring and pivot said locking arm to said release position when said hitch assembly is lowered;
   power means connected with said hitch assembly;
   said power means being operative to selectively raise said hitch assembly to position said connecting pin beneath the level of said trailer tongue;
   said power means being operative to selectively raise said hitch assembly to position said connecting pin within said trailer tongue aperture;
   said locking device being moved to a release position when said hitch assembly is lowered; and
   said locking device being moved to an operative position after said hitch assembly is raised.

5. A trailer hitch apparatus as defined in claim 4 wherein said control cable is connected to said locking arm by a tension spring.

6. A trailer hitch apparatus as defined in claim 4 wherein said control cable is adjusted to a substantially taut condition when said hitch assembly is raised so that said control cable exerts a pulling force on said locking arm as said hitch assembly is lowered, thereby moving said locking device to its release position.

7. A trailer hitch apparatus as defined in claim 4 wherein said locking device further includes a lug projecting from said locking arm and a control rod coupled to said lug, said biasing spring exerting a downward pressure upon said control rod.

* * * * *